(12) United States Patent
Guenther et al.

(10) Patent No.: US 7,212,356 B2
(45) Date of Patent: May 1, 2007

(54) MOUNTING MECHANISM FOR COMPENSATING OPTICS IN INTERFEROMETER

(75) Inventors: Bryan W. Guenther, Tucson, AZ (US); Erik L. Novak, Tucson, AZ (US)

(73) Assignee: Veeco Instruments Inc., Tucson, AZ (US)

( * ) Notice: Subject to any disclaimer, the term of this patent is extended or adjusted under 35 U.S.C. 154(b) by 108 days.

(21) Appl. No.: 11/061,178

(22) Filed: Feb. 18, 2005

(65) Prior Publication Data

US 2006/0120088 A1    Jun. 8, 2006

Related U.S. Application Data

(63) Continuation-in-part of application No. 11/003,538, filed on Dec. 3, 2004.

(51) Int. Cl.
*G02B 7/02* (2006.01)

(52) U.S. Cl. .................... 359/819; 359/822; 359/811
(58) Field of Classification Search ............. 359/819, 359/821, 822, 824, 825, 826, 811, 813, 814
See application file for complete search history.

(56) References Cited

U.S. PATENT DOCUMENTS

| 4,135,778 | A  | * | 1/1979 | Lincoln ................. 359/381 |
| 6,628,339 | B1 | * | 9/2003 | Ferland et al. ........... 348/374 |
| 2002/0197075 | A1 | * | 12/2002 | Crockett ................. 396/429 |

* cited by examiner

*Primary Examiner*—Timothy Thompson
(74) *Attorney, Agent, or Firm*—Antonio R. Durando (57) ABSTRACT

An interferometric profiler includes an opening adapted to receive a removable compensating element in the reference arm. The compensating element is mounted on a holder adapted for slidable engagement within the opening. A retaining mechanism keeps the holder firmly in place in the opening. The reference mirror of the profiler is mounted on a slidable stage urged away from the compensating element by a spring-loaded mechanism. A knob is provided to manually push the stage inward to its operating position proximate to the compensating element. A stop ensures that the travel of the stage is limited to a safe distance from the compensating element and a lock is provided to releasably hold the stage in place during use. Multiple objectives with different magnifications may be coupled to the module for alternative use according to the needs of particular applications. An illumination module may also be coupled to the reference-arm module.

22 Claims, 11 Drawing Sheets

SECTION A-A

MOUNTING MECHANISM FOR COMPENSATING OPTICS IN INTERFEROMETER

RELATED APPLICATIONS

This application is a continuation-in-part application of U.S. Ser. No. 11/003,538, filed Dec. 3, 2004.

BACKGROUND OF THE INVENTION

1. Field of the Invention

This invention pertains to the general field of optical profilometry. In particular, the invention relates to interferometric measurements conducted through a transmissive medium in the sample and the use of a compensating element in the reference arm of the interferometer.

2. Description of the Prior Art

Interferometric optical systems are widely used to measure surface features because of their speed, accuracy and flexibility. Often the sample surface is tested through a transmissive medium, such as the glass of a biological-sample slide or the package of an electronic device (micro-electro-mechanical systems—MEMS, for example). Similarly, samples placed in an environmental chamber to study the effects of pressure, temperature, humidity and/or reactants are normally tested through a dispersive medium. Also, some parts of devices are operated while immersed in a liquid medium, such as objects used in biology and ink-jet printing, and hard-drive sliders that fly in a lubricating medium. Performing high lateral-resolution metrology on such parts cannot be accomplished using conventional methods.

These transmissive fixed media tend to degrade the interferometric measurement because of dispersion and aberration effects. Moreover, longer working-distance optics are required to accommodate the additional distance to the test surface when such a protective layer is present in the sample. Therefore, when a transmissive fixed layer is present in the path of the measurement beam, an equivalent compensating element in the path of the reference beam of the interferometer has been used in the past to minimize the dispersion, aberration and interference effects of the transmissive layer. While this solution is normally acceptable for low magnification systems (less than about 10x), it has been found to be unacceptable at higher magnifications where all system defects tend to become more and more significant. Even the use of an objective specifically corrected for the aberrations introduced by the transmissive layer was surprisingly found not to improve significantly the quality of the fringes produced by conventional interferometric profilers.

Co-owned U.S. Ser. No. 11/003538 describes an advance in the art of usage of compensating elements by combining such an element with a collimated light and an aberration-corrected objective with a long working distance. This combination was found to produce a greatly improved fringe contrast in the measurement of a sample surface through a dispersive element. When the dispersive element consists of a fixed cover with substantially consistent characteristics from sample to sample, the compensating element is a plate that matches the optical characteristics of the dispersive element. When the dispersive element varies, the compensating element consists of a variable-thickness transmissive element embodied in a pair of half-cube prisms adapted to slide along the beam-splitting plane, thereby permitting the adjustment of the optical path-length through the splitter in the reference-beam direction while retaining unchanged the optical path-length in the test-beam direction.

Inasmuch as the compensating plates described in Ser. No. 11/003538 need to be changed to vary the thickness of the compensating element to match the properties of the dispersive element in the sample, it is crucial that a mechanism be provided that permits the exchange of plates without affecting the calibration and optical performance of the system, or the integrity of both the compensating plate and the optics within the module where the plates are installed.

Another challenge arises from the fact that for many applications the compensating element is very close to the surface of the reference mirror and, therefore, the process of installation or removal can easily cause damage to either or both elements. In order to avoid these problems, prior-art compensating plates were installed as permanent fixtures in the reference arm of the interferometer. Thus, as a further advancement of the concept described in Ser. No. 11/003538, this invention describes a modular housing and a mechanism suitable for the rapid and safe installation and removal of different compensating plates of different thickness.

BRIEF SUMMARY OF THE INVENTION

Figure 1:
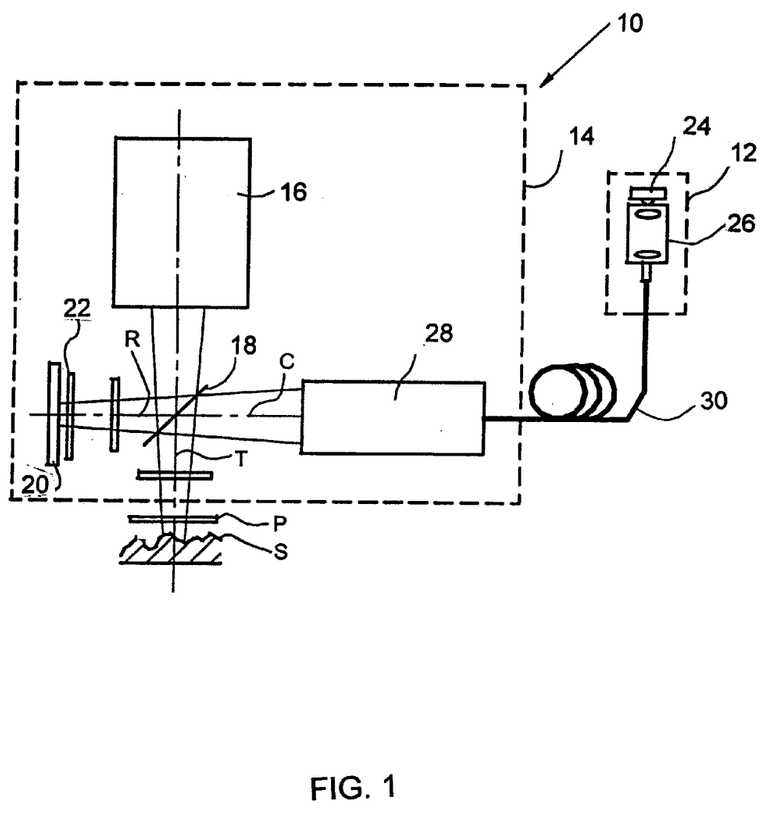
FIG. 1 illustrates schematically the basic set up of a modular assembly suitable for replacement of the objective of a conventional interferometric profiler, wherein the assembly includes an objective, a reference-arm module, and a light source.

FIG. 1 illustrates schematically the basic set up of a modular system 10 according to the invention described in Ser. No. 11/003538. This system is suitable for replacement of the objective of a conventional interferometric profiler and is judiciously designed to optimize the profiler's performance when used to test a sample surface S covered by a dispersive element P (such as a glass plate) in the optical path of the test beam T. The system includes a separate illumination module 12 and an objective module 14 intended for replacement of the standard objective of a conventional profiler. The objective module includes an objective 16 that is corrected for the aberrations expected to be introduced by the dispersive element P and is adapted for alignment along the optical path of the conventional objective it replaces.

The illumination module 12 is capable of delivering a substantially collimated light beam C to a beam-splitting element 18 (in module 14) that is adapted to produce the test beam T directed to the sample surface S and a reference beam R directed to a reference surface 20. In addition, a transmissive compensating element 22, selected to essentially match the optical properties of the dispersive element P, is placed in front of the reference or the optical effects of the plate P. The splitter element 18 is preferably a pellicle in order to minimize aberration and the effects of imperfections in the collimation of the light impinging on the beamsplitter. The working distance of the objective 16 has to be sufficiently long to accommodate the presence of the pellicle 18 and a correspondingly extended housing between the objective and the exterior sample to be tested, including the thickness of the dispersive element P.

In practice, the illumination module 12 is preferably implemented using a conventional light source 24 (such as an LED, a standard filament-based bulb, a superluminescent diode) combined with a system of optics 26,28, both within the light source and the objective module 12, designed to produce a substantially collimated beam C at the splitter 18. An optical fiber 30 may be used to connect the illumination and objective modules, as shown. Alternatively, the illumination module 12 may be attached directly to the objective module 10.

Figure 2:
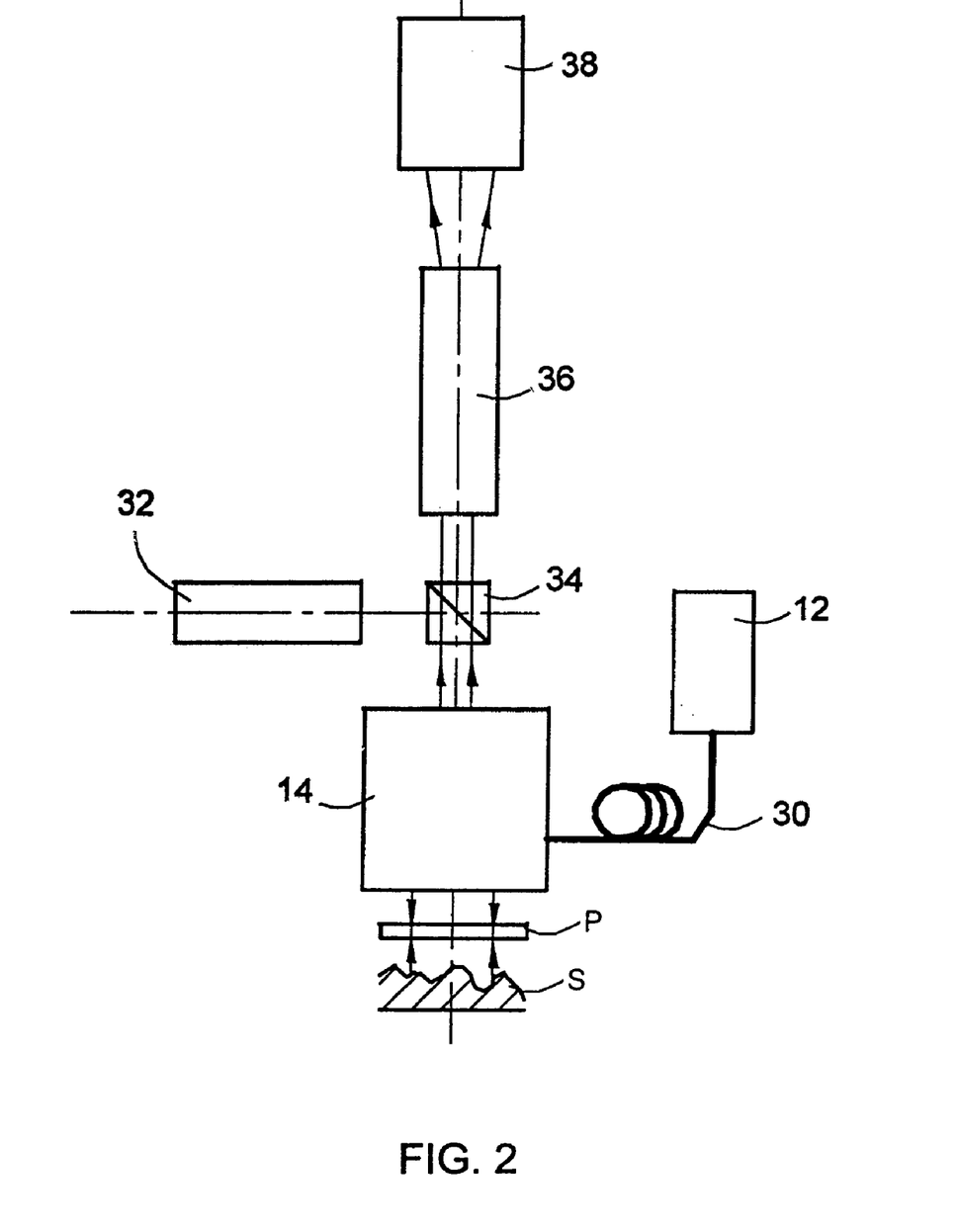
FIG. 2 shows schematically the assembly of FIG. 1 coupled to a conventional interferometer.

FIG. 2 illustrates schematically a conventional profiler wherein the objective has been replaced by the system 10 of the present invention and the illumination module 12 is connected as shown in FIG. 1. The module 12 replaces functionally the illumination source 32 of the profiler that normally produces a light beam directed toward a beam-splitter 34, which in turn reflects it toward an interferometric microscope objective (preferably of Linnik, Mirau or Michelson configuration), which in the invention is replaced by the objective module 14. As is well understood in the art, the light beam is split in the objective into a test beam illuminating the sample surface S and a reference beam directed toward the reference surface that is normally contained within the objective. The test and reference beams are reflected back through the objective and the beam-splitter 34 into an imaging system 36 and a camera or other light sensing device 38 for data acquisition.

A monitor (not shown) is typically used to view the images detected by the camera 36. A focusing and scanning mechanism (also not shown) is used to focus the sample image and to vary the optical path difference between the two beams and produce the interferometric fringes used to measure the test surface S. Finally, a computer system (not shown) is connected to the camera and the focus and scanning mechanism to control the focusing process, the interferometric scan, the data acquisition steps, and to perform analysis of the fringes produced by the scan.

According to the present invention, the objective module 14 comprises an objective releasably coupled to a reference-arm module. This module includes an opening adapted to receive a removable compensating element in alignment with the optics of the reference arm. In the preferred embodiment of the invention, the compensating element is mounted on a support frame that is in turn coupled to a holder adapted for slidable engagement within the opening of the reference-arm module. A retaining mechanism keeps the holder firmly in place in the opening, preferably butting against a support structure for alignment in the housing of the module.

The reference mirror of the system is mounted on a stage slidably engaged to a rail attached to the housing of the reference-arm module. The stage is urged away from the compensating element by a spring-loaded mechanism. A knob is provided outside the module to manually push the stage (and therefore also the reference mirror) inward against the urging mechanism to its operating position proximate to the compensating element. A stop ensures that the travel of the stage is limited to a safe distance from the compensating element to avoid damage to it or to the reference mirror when the stage is moved inward. A lock and release mechanism is provided to hold the stage in place during use and to allow the stage to slide outwardly to a retracted position prior to removal and/or insertion of a compensating element. A threaded mechanism is provided to allow precise axial translation of the stage to adjust the focus of the reference mirror.

The illumination module may be coupled to the reference-arm module through a fiber optic, as illustrated in FIG. 2, or it may be coupled directly and rigidly to the reference-arm module. According to another aspect of the invention, multiple objectives may be provided with different magnifications for alternative use with the reference-arm module to meet the needs of any particular application, thereby utilizing the modular configuration of the invention to add flexibility to its operation. Each objective is preferably housed in a tubular structure of fixed length and adapted for quick-release coupling with the reference-arm module, wherein the layout of the optics is tailored to optimize the operating range of the particular magnification of the objective. Thus, different objectives with a wide range of magnification can be installed within the fixed working distance of a conventional interferometer.

Various other aspects and advantages of the invention will become clear from the description that follows and from the novel features particularly recited in the appended claims. Therefore, to the accomplishment of the objectives described above, this invention consists of the features hereinafter illustrated in the drawings, fully described in the detailed description of the preferred embodiments, and particularly pointed out in the claims. However, such drawings and description disclose only some of the various ways in which the invention may be practiced.

DETAILED DESCRIPTION OF THE INVENTION

This invention lies in the combination of mechanisms used to implement the concept of a removable compensating element in the reference arm of an interferometric profiler in a manner that is suitable for practical operation. The features of the invention make it possible to install rapidly and safely different compensating elements in the optical path of the reference beam to match a corresponding dispersive medium in the sample being tested.

As used herein, "compensating element" and "compensating plate" refer to any transmissive component introduced in the optical path of the reference beam of an interferometric profiler in order to compensate for the dispersion, coherence and interference effects of a dispersive element in the optical path of the test beam. Such a compensating element may consist of a single optical component or of multiple components optically coupled to produce a desired effect. The term "dispersive element" is used to refer to any transparent substance or cover on a sample surface in the optical path of a test beam of a profiler used to measure the surface. Such dispersive elements may also be referred to as transmissive plates in the description of the invention, such as in the case of biological slides. The term "plate" is intended to encompass any shape of such compensating and dispersive elements, whether or not it approximates the actual geometry of a plate, and can include compound elements, such as a fluid cell containing a liquid sandwiched between two layers of glass or plastic, or a cell containing a holographic optical element.

Figure 3:
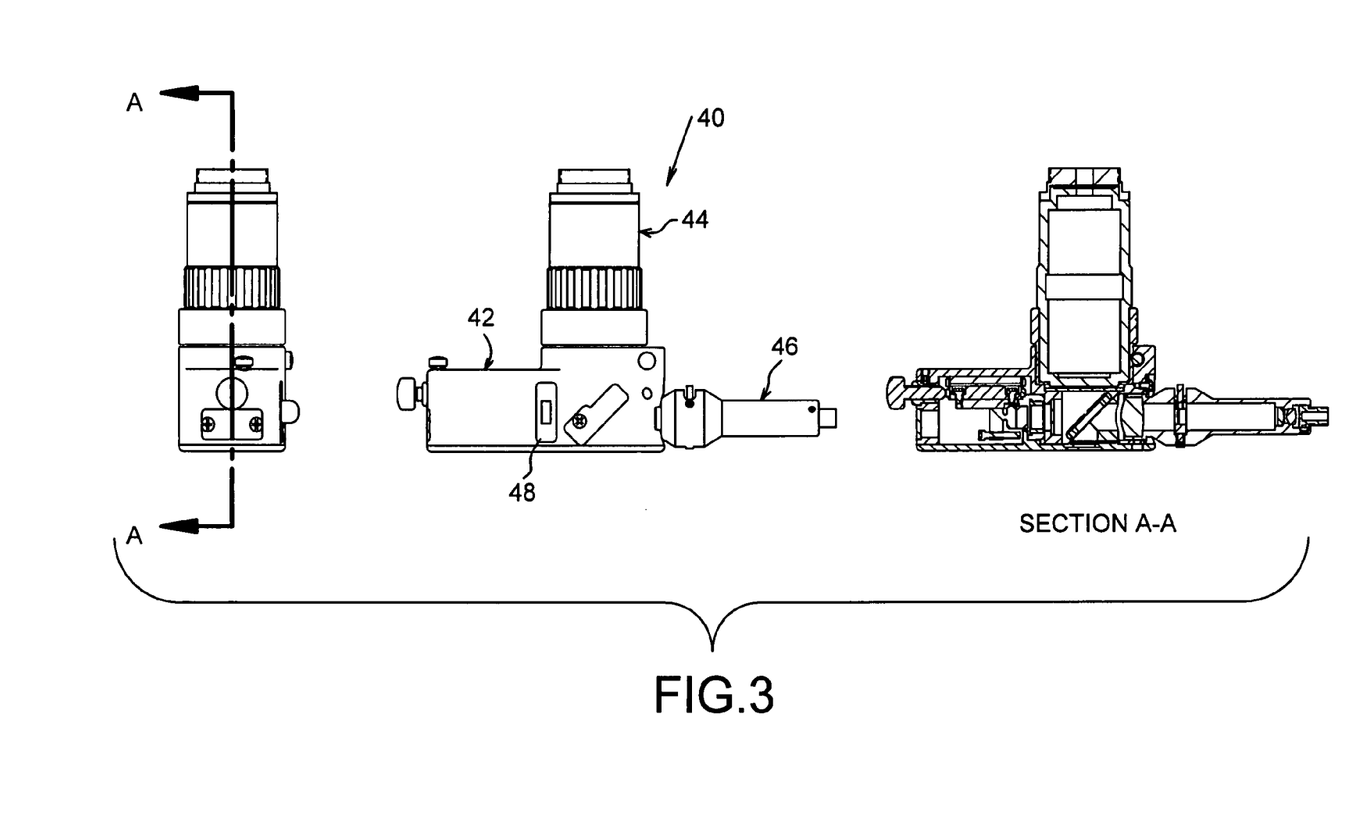
FIG. 3 illustrates an actual embodiment of the assembly of FIG. 1 according to the present invention.

Referring to the figures, wherein like parts are referenced with the same numerals and symbols, FIG. 3 is an elevational front view of the modular assembly 40 of a system according to the invention. It consists of a reference-arm module 42, and an objective 44 and a light source 46 releasably coupled to it. In this embodiment of the invention, the assembly 40 is adapted for replacement of the objective of a conventional interferometric profiler, such as Wyko's NT 8000. As shown in the cross-sectional view of FIG. 4, the reference-arm module 42 includes a beam-splitter 18 (see also FIG. 1) and a reference mirror 20 for operation as detailed in Ser. No. 11/003538. According to the present invention, an opening 48 is provided in the side of the reference-arm module 42 for placing a compensating element 22 in the optical path of the reference beam.

Figure 4:
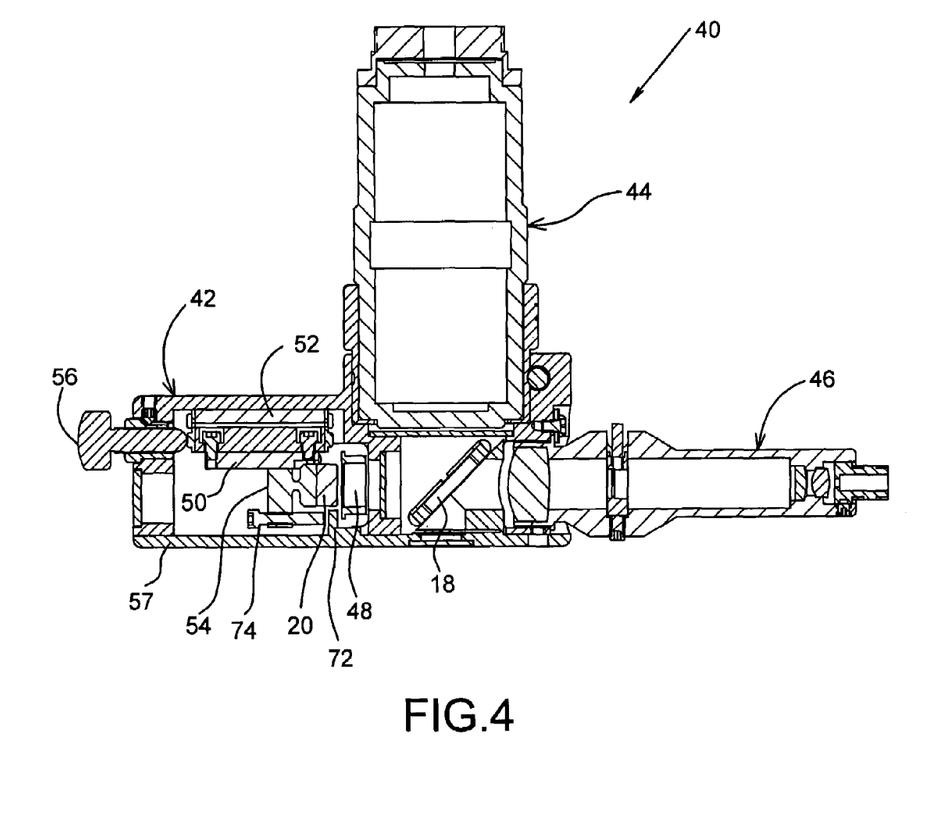
FIG. 4 is a cross section of FIG. 3 that shows the internal components of the reference-arm module of the invention.

The optical requirements of the invention detailed in Ser. No. 11/003538 sometimes necessitate that the reference mirror 20 and the removable compensating element of the invention be positioned in close proximity. Therefore, if the reference mirror 20 were kept in fixed position during the replacement of the compensating element, it would be likely to cause damage to one or both of them. Accordingly, the invention provides a stage 50 that is preferably slidably coupled to a support 52, such as a rail attached to the housing of the reference-arm module 42. Thus, the reference mirror 20, which is rigidly attached to the stage 50 by means of a support frame 54, can be easily retracted and moved away from the space dedicated to the compensating element in order to permit its safe insertion and removal through the opening 48. A knob 56, extending axially outside the housing of the module 42, is provided to manually retract or push inward the stage 50. Alternatively, the axial position of the stage and reference mirror may be adjusted using a conventional focusing mechanism, such as a screw adapted to move the reference mirror along the optical axis of the reference arm.

The reference mirror 20 is referred to in this disclosure of the invention as a permanent element of the optical assembly because, for any given application, it is not intended to be removed from the system. However, the term "permanent" is not intended to exclude a removable element, such as a reference mirror, that can be exchanged with another element between applications. Therefore, the invention should not be restricted to elements that are permanently fixed to the stage.

Figure 5:
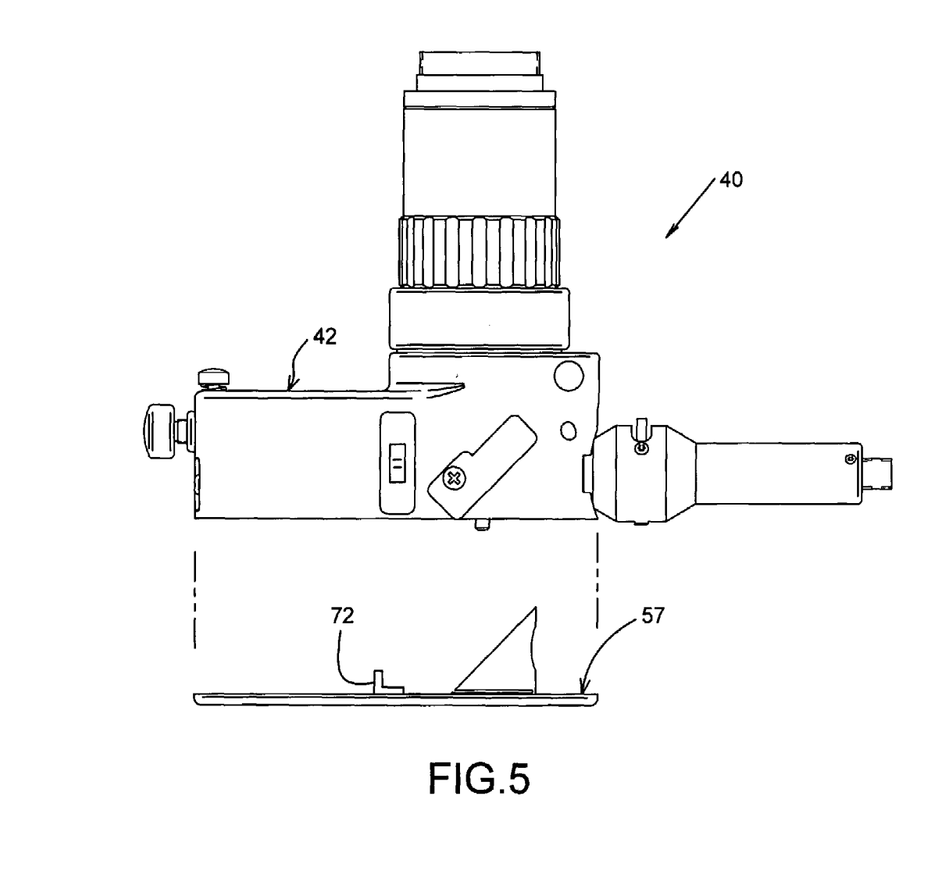
FIG. 5 is the same assembly of FIG. 3 showing the bottom plate of the reference-arm module removed from it.
Figure 6:
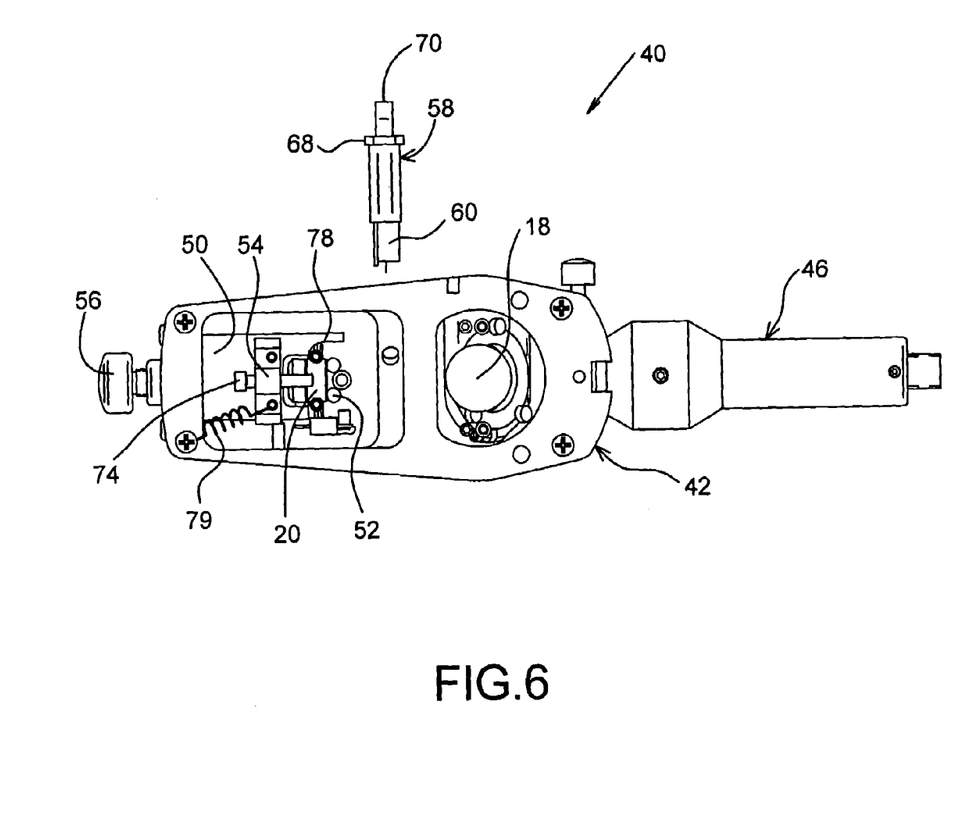
FIG. 6 is a bottom view of the assembly of FIG. 3 without the bottom plate of the reference-arm module and showing the stage of the invention in inward operating position.
Figure 7:
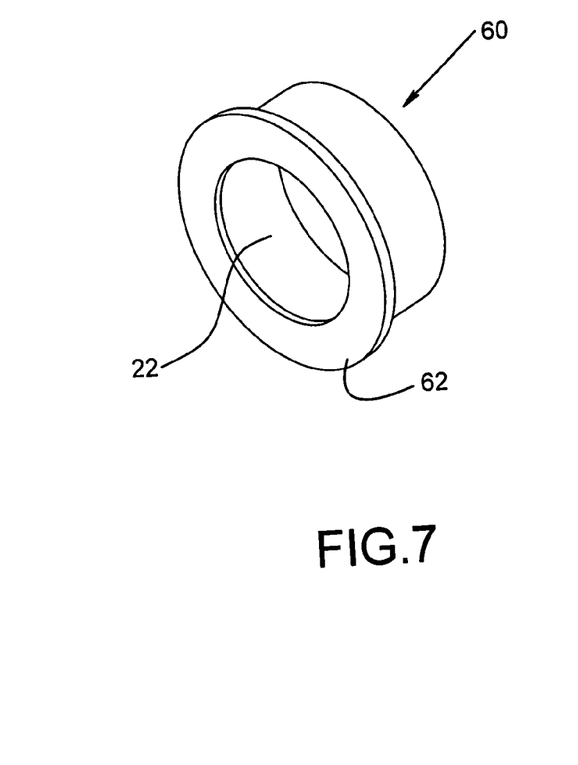
FIG. 7 is a perspective view of a compensating element and a frame for attachment to a holder.
Figure 8:
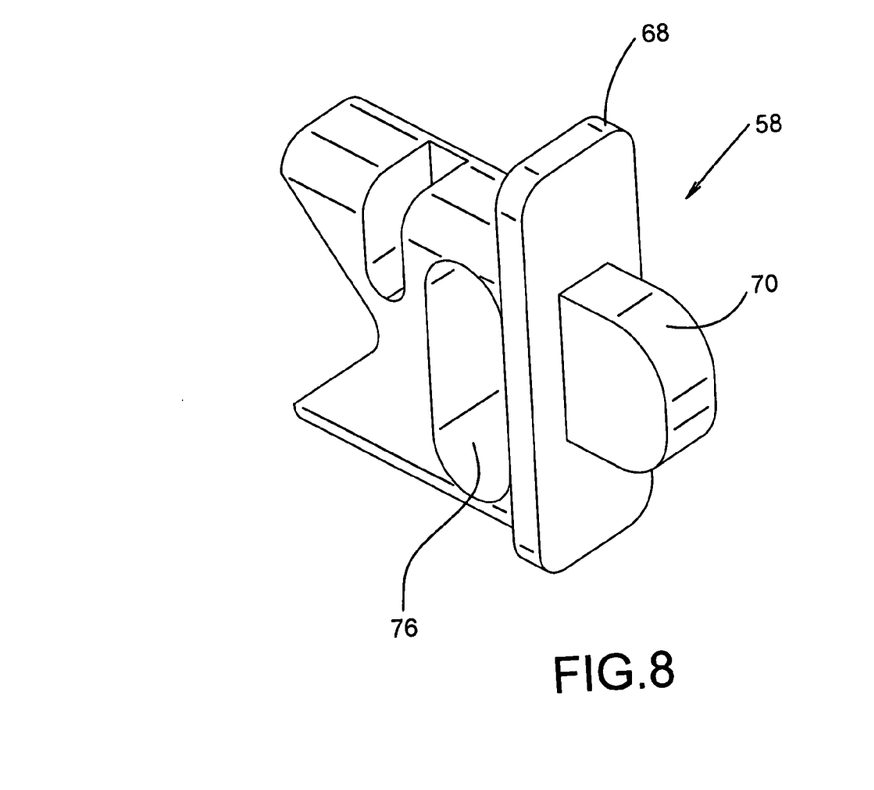
FIG. 8 is a perspective view of a holder for the frame of FIG. 7.
Figure 9:
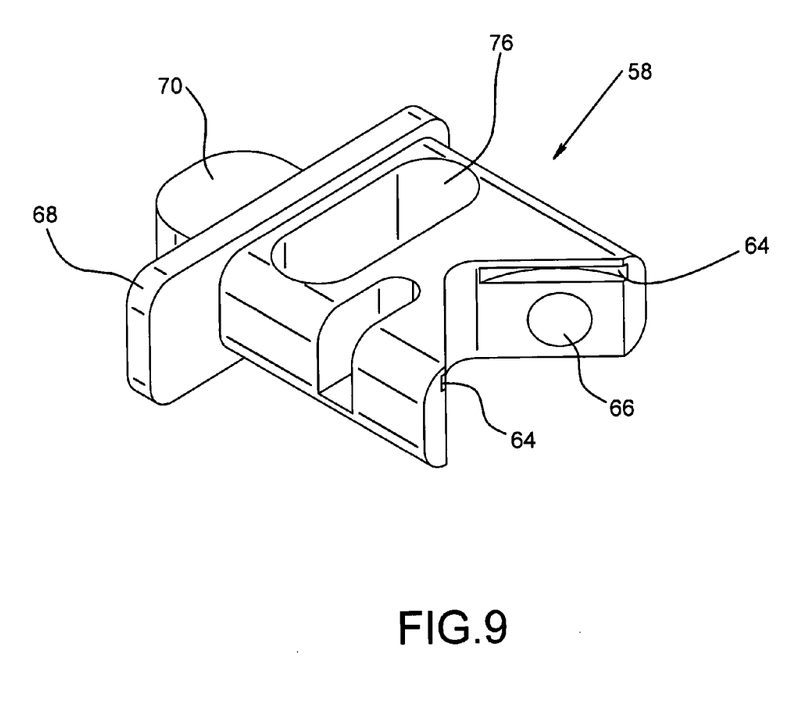
FIG. 9 is another perspective view of the holder of FIG. 8 seen from the opposite side.

FIG. 5 is the same view of the assembly 40 of FIG. 3 wherein the bottom cover plate 57 of the reference-arm module 42 has been removed. FIG. 6 shows, in bottom view, the interior of open reference-arm module of FIG. 5. Referring to FIG. 6, the stage 50 is illustrated in its retracted position ready to receive a compensating element 22 mounted on a holder 58 through the opening 48. As illustrated in FIGS. 7–9, the compensating element 22 is mounted in a frame 60 for handling and securing to the holder 58. In the preferred embodiment, a flange 62 and corresponding grooves 64 are provided in the frame and holder, respectively, to ensure a precise alignment and connection between the two. Furthermore, one or more magnetic element 66 is used to attract and hold firmly in place the frame 60 (which, of course, in this case would have to be made of ferromagnetic material). An end plate 68 of the holder 58 is preferably made to conform to the opening of the opening 48 in order to provide closure when the compensating element is inserted for operation. A knob 70 is provided to allow manual handling of the holder. Thus, the compensating element of the invention may be manually inserted into or removed from the reference-arm module through the opening 48 while the stage 50 is retracted. A guide 72 in the bottom plate 57 may also be used to further control the alignment of the compensating element within the reference-arm module.

Figure 10:
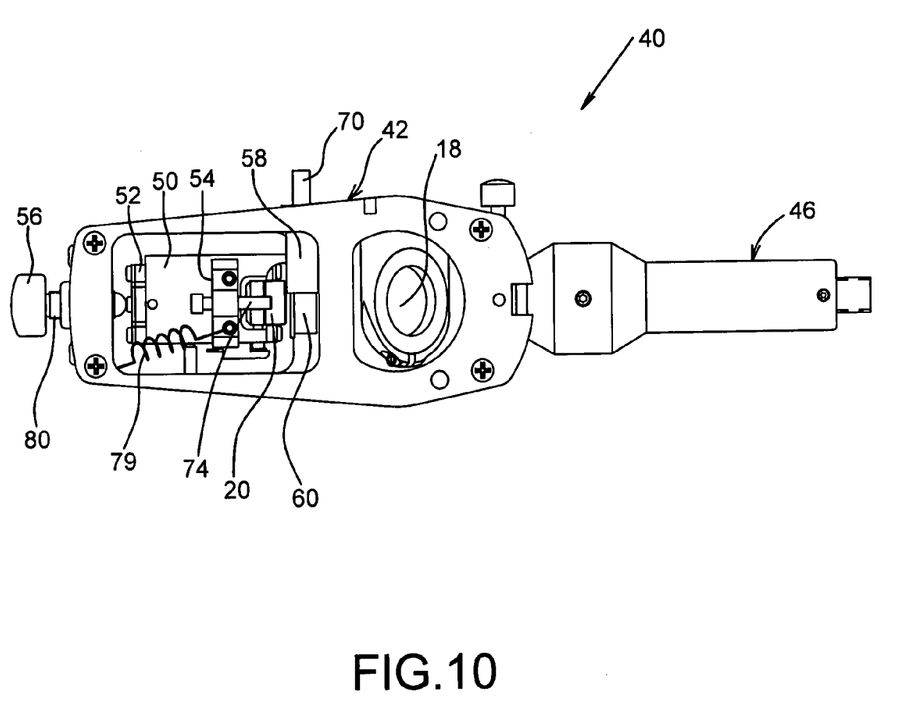
FIG. 10 is a bottom view of the assembly of FIG. 3 without the bottom plate of the reference-arm module and showing the stage of the invention in outward retracted position.

Prior to operation of the profiler after the compensating element is installed, the stage 50 is pushed inward to its operating position using the knob 56, as illustrated in FIG. 10. An adjustable stop 74, butting against the guide 72 in the bottom plate 57 of the module, is used to limit the inward motion of the stage in order to prevent excessive travel and damage to the compensating element or the reference mirror. The travel motion of the stage is used advantageously to provide a locking mechanism for the holder 58, so that it cannot be removed from the module while the stage is in the operating position. To that end, a slot 76 is incorporated into the body of the holder 58 and a corresponding conforming plunger 78 is incorporated into the body of the stage 50 (see FIG. 6). The length and alignment of the plunger 78 are selected so that it engages the slot 76 when the stage is in its inward, operating position (FIG. 10) and it releases the slot (and correspondingly the holder 58 of the compensating element) when the stage is in its outward, retracted position (FIG. 6).

Figure 11:
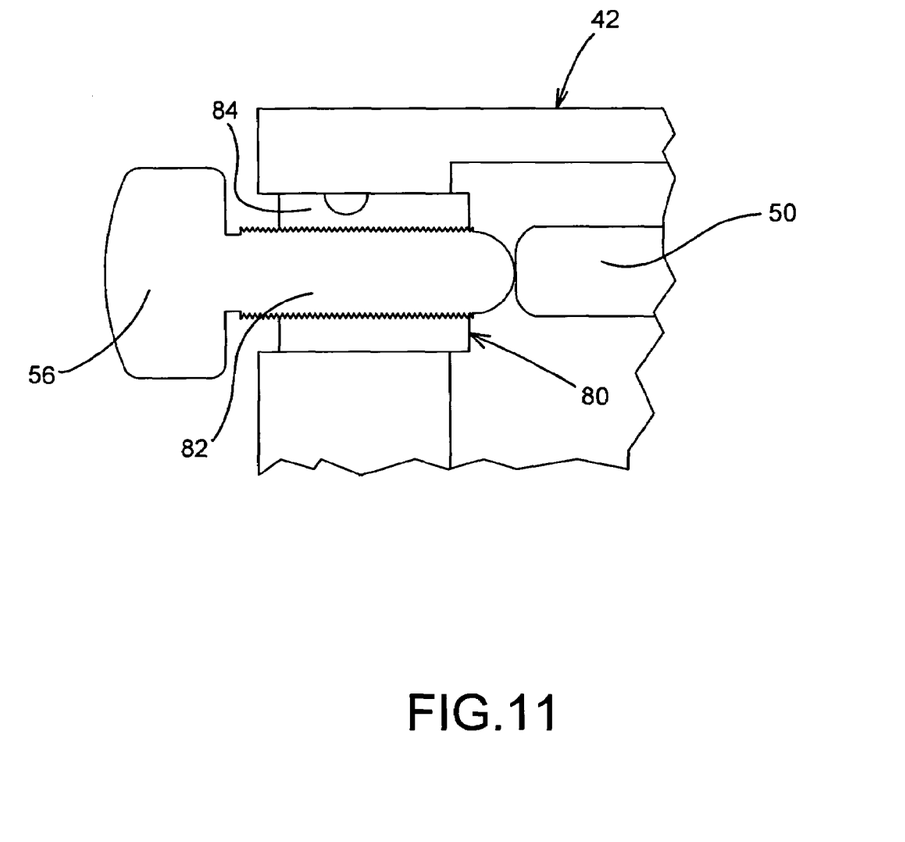
FIG. 11 is a partial cross-section of the focusing mechanism and assembly connecting the stage to the exterior actuating knob.
Figure 12:
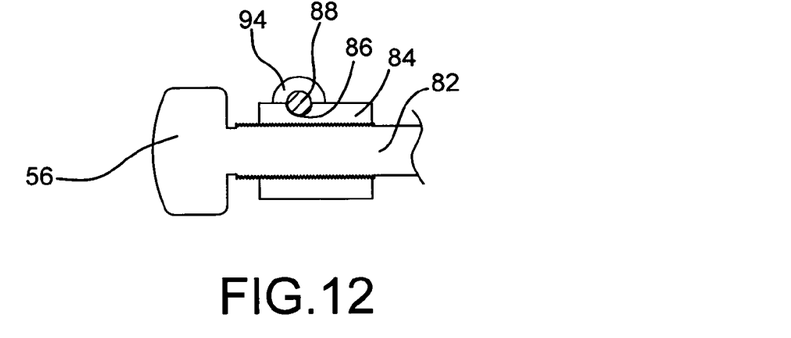
FIG. 12 is an elevational view showing the arrangement of the releasable locking mechanism used to retain the stage of the invention in operating position.
Figure 13:
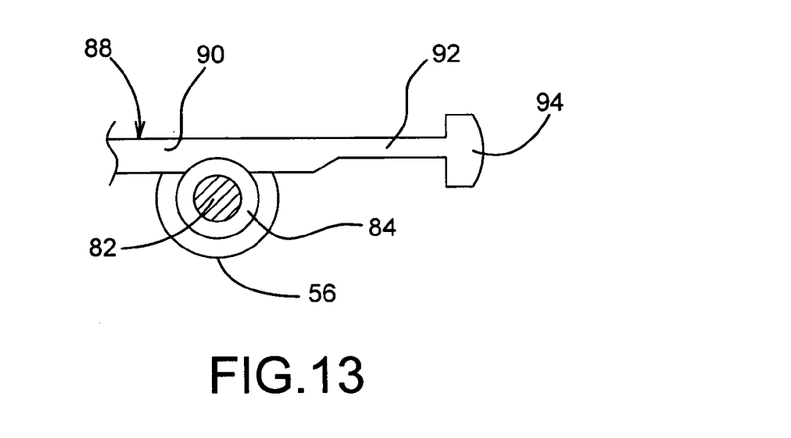
FIG. 13 is an elevational view taken from the right side of FIG. 11 showing the locking mechanism in locked condition.
Figure 14:
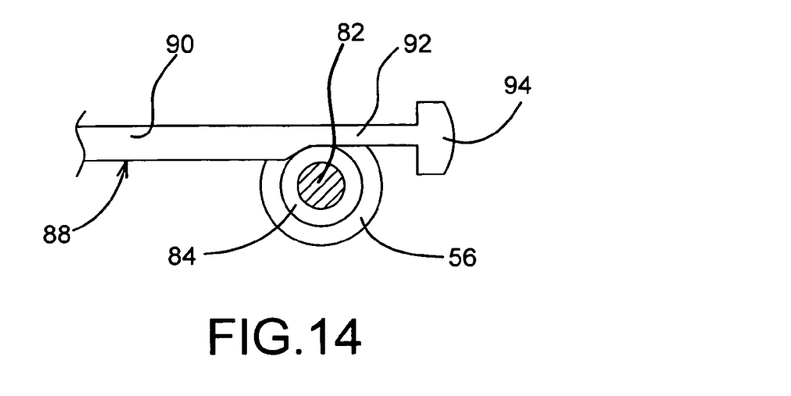
FIG. 14 is an elevational view taken from the right side of FIG. 11 showing the locking mechanism in released condition.

As mentioned, the stage 50 is urged toward its retracted position by a spring 79 (FIGS. 6 and 10) or other urging device. Therefore, a lock and release mechanism is needed to retain the stage in its inward position after it is pushed in for operation. Such a mechanism may be advantageously implemented by providing a locking key in the housing of the module 42 and a notch in the assembly 80 connecting the knob 56 to the stage 50 (see FIG. 11). Specifically, as illustrated in the partial views of FIGS. 11–14, the knob 56 acts on the stage 50 through a rotatable shaft 82 that is threaded in a slidable sleeve 84 in the housing of the reference-arm module 42. A round notch 86 is cut in the sleeve 84 to provide an opening appropriately sized to engage a spring-loaded transverse shaft 88 (shown in cross section in FIG. 12). As seen in FIGS. 13 and 14, the transverse shaft 88 includes a round portion 90 and a recessed flat portion 92, and it is urged by a spring (not shown) in the direction of the flat portion, so that the round portion 90 automatically engages the notch 86 when the notch 86 becomes aligned with the transverse shaft 88 as the stage 50 reaches its operating position. Thus, the stage remains locked in place for operation (FIGS. 12 and 13). The knob 56 can then be used advantageously to turn the shaft 82 and adjust the focus of the reference mirror 20 through the shaft's axial translation.

When the transverse shaft 88 is pushed in manually using an exterior knob 94 attached to it, the sleeve 84 is released as soon as the flat portion 92 of the transverse shaft 88 passes through the notch 86, as illustrated in FIG. 14, thereby allowing the sleeve 84 to travel outwardly toward its retracted position. As a result, the stage 50, urged outward by the spring 79, also moves toward its retracted position.

Thus, a mechanism has been described that enables the fast, safe and reliable installation of a compensating plate in the reference arm of a profiler to accommodated the requirements of different samples that include a dispersive layer in front of the surface of interest. The mechanism may be included in the reference arm of a conventional profiler, or in a modular reference-arm component designed to retrofit a conventional profiler. In this case, the component may include an objective for replacement of the original objective of the conventional profiler. Multiple objectives with different magnifications may be provided for quick-release coupling to the modular reference-arm component. An additional light source may also be coupled to the module, either through a fiber optic or directly through a rigid connection.

Various changes in the details that have been described may be made by those skilled in the art within the principles and scope of the invention herein illustrated and defined in the appended claims. For example, the invention has been described in terms of an interferometric profiler, but it clear that the same concept and structural arrangement could be used as well in any type of device that includes two elements in close working distance when one of the elements needs to be replaced. Thus, while the invention has been shown and described in what are believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

What is claimed is:

1. A mechanism for installing a removable element in alignment with and at a predetermined distance from a permanent element contained in a housing of an optical assembly, comprising:
   an opening in the housing for installing the removable element in an optical path of the optical assembly;
   a stage for holding the permanent element, said stage being movable for translation of the permanent element toward and away from the removable element;
   a focusing mechanism for positioning the permanent element in focus along said optical path of the optical assembly;
   stopping means for preventing said translation of the permanent element toward the removable element beyond said predetermined distance from the removable element;
   releasable means for looking the stage when the permanent element is at said predetermined distance from the removable element; and
   means for urging the stage away from the removable element when said releasable means is released.

2. A mechanism for installing a removable element in alignment with and at a predetermined distance from a permanent element contained in a housing of an optical assembly, comprising:
   an opening in the housing for installing the removable element in an optical path of the optical assembly;
   a stage for holding the permanent element, said stage being movable for translation of the permanent element toward and away from the removable element;
   a focusing mechanism for positioning the permanent element in focus along said optical path of the optical assembly;
   stopping means for preventing said translation of the permanent element toward the removable element beyond said predetermined distance from the removable element;
   wherein said stopping means is adjustable to vary said predetermined distance.

3. A mechanism for installing a removable element in alignment with and at a predetermined distance from a permanent element contained in a housing of an optical assembly, comprising:
   an opening in the housing for installing the removable element in an optical path of the optical assembly;
   a stage for holding the permanent element, said stage being movable for translation of the permanent element toward and away from the removable element;
   a focusing mechanism for positioning the permanent element in focus along said optical path of the optical assembly;
   wherein said removable element is mounted on a holder and said stage includes means for engaging the holder when the permanent element is at said predetermined distance from the removable element.

4. The mechanism of claim 3, wherein said means for engaging the holder includes a plunger protruding from the stage into a slot in the holder.

5. The mechanism of claim 3, wherein the removable element is mounted in a ferromagnetic frame and the holder includes a magnet for attracting the ferromagnetic frame.

6. The mechanism of claim 3, further comprising a first knob connected to said stage and extending from the housing for effecting said translation of the permanent element.

7. A mechanism for installing a removable element in alignment with and at a predetermined distance from a permanent element contained in a housing of an optical assembly, comprising:
   an opening in the housing for installing the removable element in an optical path of the optical assembly;
   a stage for holding the permanent element, said stage being movable for translation of the permanent element toward and away from the removable element;
   a focusing mechanism for positioning the permanent element in focus along said optical path of the optical assembly;
   stopping means for preventing said translation of the permanent element toward the removable element beyond said predetermined distance from the removable element;
   releasable means for locking the stage when the permanent element is at said predetermined distance from the removable element; and
   a first knob connected to said stage through an axial shaft and extending from the housing for effecting said translation of the permanent element;
   wherein said releasable means for locking the stage includes a notch in the axial shaft and a transverse shaft adapted to engage said notch when the permanent element is at said predetermined distance from the removable element.

8. The mechanism of claim 7, further comprising a second knob connected to said transverse shaft and extending from the housing for disengaging said notch.

9. The mechanism of claim 7, wherein said focusing mechanism comprises a threaded bolt coupling the first knob and the axial shaft.

10. A mechanism for installing a removable element in alignment with and at a predetermined distance from a permanent element contained in a housing of an optical assembly, comprising:
- an opening in the housing for installing the removable element in an optical path of the optical assembly;
- a stage for holding the permanent element, said stage being movable for translation of the permanent element toward and away from the removable element;
- a focusing mechanism for positioning the permanent element in focus along said optical path of the optical assembly;
- stopping means for preventing said translation of the permanent element toward the removable element beyond said predetermined distance from the removable element;
- releasable means for locking the stage when the permanent element is at said predetermined distance from the removable element;
- a knob connected to the stage and extending from the housing for effecting said translation of the permanent element; and
- means for urging the stage away from the removable element when the releasable means is released;
- wherein the stopping means is adjustable to vary said predetermined distance, the releasable means for locking the stage includes a notch in an axial shaft connecting the knob to the stage and a transverse shaft adapted to engage the notch when the permanent element is at said predetermined distance from the removable element, the focusing mechanism includes a threaded bolt coupling the knob and the axial shaft, the removable element is mounted on a holder, the stage includes means for engaging the holder when the permanent element is at said predetermined distance from the removable element, the means for engaging the holder includes a plunger protruding from the stage into a slot in the holder, the removable element is mounted in a ferromagnetic frame, and the holder includes a magnet for attracting, the ferromagnetic frame.

11. An optical-element structure for removably installing an optical element in an optical assembly in alignment with and at a predetermined distance from a permanent element, comprising:
- an optical element;
- a frame supporting the optical element; and
- a holder coupled to said frame;
- wherein the holder is adapted for removable insertion into an opening in a housing of said optical instrument, and the holder includes a slot for engagement by a retractable plunger in the housing when the holder is fully inserted into said opening.

12. An optical-element structure for removably installing an optical element in an optical assembly in alignment with and at a predetermined distance from a permanent element, comprising:
- an optical element;
- a frame supporting the optical element; and
- a holder coupled to said frame;
- wherein the holder is adapted for removable insertion into an opening in a housing of said optical instrument, the frame is ferromagnetic, and the holder includes a magnet to couple the frame to the holder.

13. An optical-element structure for removably installing an optical element in an optical assembly in alignment with and at a predetermined distance from a permanent element, comprising:
- an optical element;
- a frame supporting the optical element; and
- a holder coupled to said frame;
- wherein the holder is adapted for removable insertion into an opening in a housing of said optical instrument, the holder includes a slot for engagement by a retractable plunger in the housing when the holder is fully inserted into said opening, said frame is ferromagnetic, and the holder includes a magnet to couple the frame to the holder.

14. A modular component for an optical profiler comprising:
- a housing defining an optical path of the profiler;
- an opening in the housing for installing a removable element in said optical path of the profiler;
- a stage for holding a permanent element of the profiler;
- a focusing mechanism for positioning the permanent element in focus along said optical path of the profiler; and
- means for urging the stage away from the removable element;
- wherein said stage is movable for translation of the permanent element toward and away from the removable element.

15. A modular component for an optical profiler comprising:
- a housing defining an optical path of the profiler;
- an opening in the housing for installing a removable element in said optical path of the profiler;
- a stage for holding a permanent element of the profiler;
- a focusing mechanism for positioning the permanent element in focus along said optical path of the profiler; and
- a light source releasably coupled to said housing and adapted to propagate a light beam toward the permanent element along said optical axis of the profiler;
- wherein said stage is movable for translation of the permanent element toward and away from the removable element.

16. A modular component for an optical profiler comprising:
- a housing defining an optical path of the profiler;
- an opening in the housing for installing a removable element in said optical path of the profiler;
- a stage for holding a permanent element of the profiler;
- a focusing mechanism for positioning the permanent element in focus along said optical path of the profiler; and
- an objective releasably coupled to said housing and adapted to receive a light beam reflected by the permanent element along said optical axis of the profiler;
- wherein said stage is movable for translation of the permanent element toward and away from the removable element.

17. A modular component for an optical profiler comprising:
- a housing defining an optical path of the profiler;
- an opening in the housing for installing a removable element in said optical path of the profiler;
- a stage for holding a permanent element of the profiler;
- a focusing mechanism for positioning the permanent element an focus along said optical path of the profiler;

a light source releasably coupled to said housing and adapted to propagate a light beam toward the permanent element along said optical axis of the profiler; and an objective releasably coupled to the housing and adapted to receive said light beam upon reflection by the permanent element along said optical axis of the profiler;

wherein said stage is movable for translation of the permanent element toward and away from the removable element.

18. A mechanism for installing a removable compensating element in alignment with and at a predetermined distance from a reference mirror contained in a reference arm of an interferometric profiler, comprising:

an opening in the housing for installing the compensating element in an optical path of the reference arm of the interferometric profiler;

a stage for holding the reference mirror;

a focusing mechanism for positioning the reference mirror in focus along said optical path of the reference arm of the interferometric profiler; and stopping means for preventing said translation of the reference mirror toward the compensating element beyond said predetermined distance from the compensating element;

wherein said stage is movable for translation of the reference mirror toward and away from the compensating element.

19. A mechanism for installing a removable compensating element in alignment with and at a predetermined distance from a reference mirror contained in a reference arm of an interferometric profiler, comprising:

an opening in the housing for installing the compensating element in an optical path of the reference arm of the interferometric profiler;

a stage for holding the reference mirror;

a focusing mechanism for positioning the reference mirror in focus along said optical path of the reference arm of the interferometric profiler;

wherein said stage is movable for translation of the reference mirror toward and away from the compensating element, and said compensating element is mounted on a holder and said stage includes means for engaging the holder.

20. The mechanism of claim 19, wherein said compensating element includes a transmissive plate.

21. The mechanism of claim 19, wherein said compensating element includes a fluid cell containing a liquid sandwiched between two transparent layers.

22. The mechanism of claim 19, wherein said compensating element includes a holographic optical element.

* * * * *